3,265,644
PARTICLE-POLYMER COMPOSITIONS AND
PROCESS FOR MAKING SAME
Daniel F. Herman, Princeton, Albert L. Resnick,
Metuchen, and Dominic Simone, New Brunswick,
N.J., assignors to National Lead Company, New
York, N.Y., a corporation of New Jersey
Filed Feb. 18, 1963, Ser. No. 259,448
8 Claims. (Cl. 260—8)

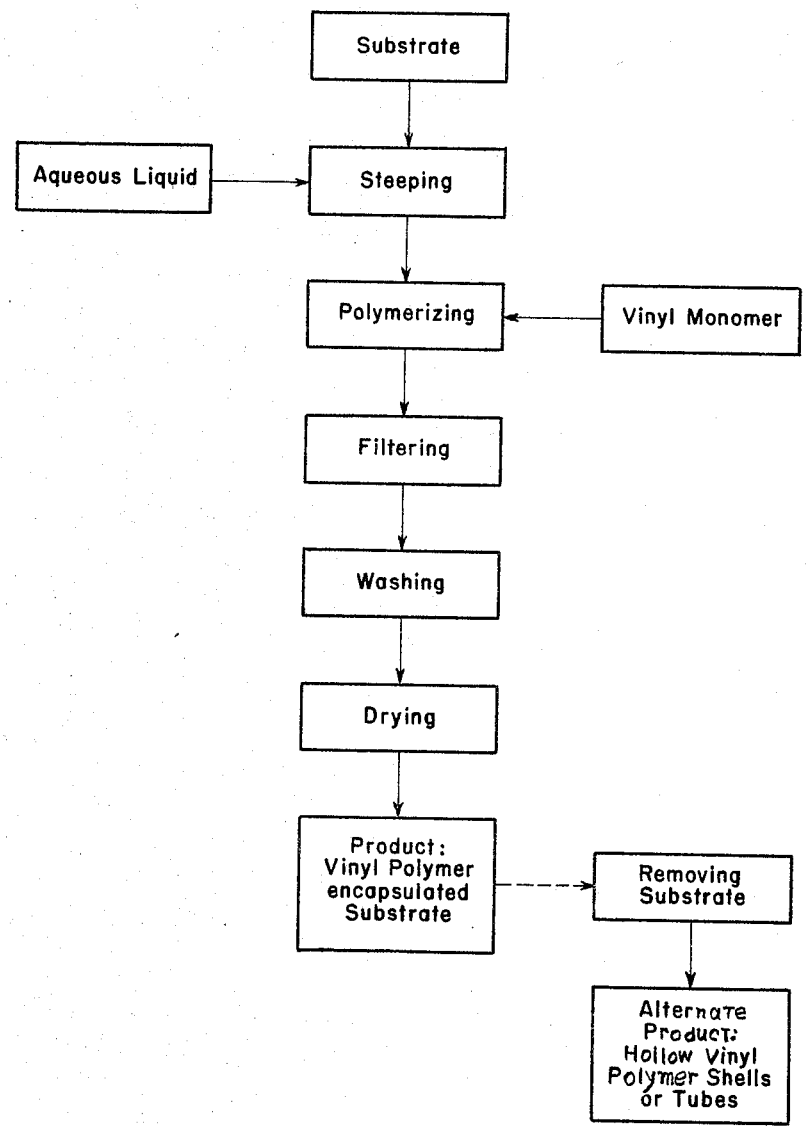
INVENTORS
Daniel F. Herman
Albert L. Resnick
Dominic Simone
BY Fred Floersheimer
ATTORNEY

United States Patent Office 3,265,644
Patented August 9, 1966

This invention relates to a process for polymerizing vinyl monomers directly onto the surfaces of finely divided particulate substrates, to the products obtained thereby, to processes for forming useful articles from such products and to the products resulting from such forming operations.

More particularly, this invention is concerned with a simple, inexpensive process for forming vinyl polymers such as polystyrene, polymethacrylates, polyacrylates, polyacrylonitrile, polyvinyl chloride, and the like, directly onto finely divided, particulate substrates, such as cellulose, wool, asbestos, silica, and the like, where each individual particle of the substrate is substantially encased in a shell of the polymer that is chemically or physically bonded thereto. This invention is also concerned with the polymer coated substrate thus prepared and with the polymer product remaining after the substrate has been removed.

An object of this invention is to provide a process whereby small particles of substrate material may be easily and inexpensively encased in individual shells of vinyl polymer anchored to the particles.

Another object of this invention is to provide a process for substantially encapsulating finely divided, particulate substrates with up to about 90% by total weight of vinyl polymers, such as polystyrene, polyvinyl chloride, polymethacrylates, polyacrylates, polyacrylonitrile, and the like.

A further object of this invention is to provide a process for substantially encapsulating particles with vinyl polymers selectively shaped as tubes or shells.

A still further object of this invention is to provide a product consisting of finely divided particles or fibers, each substantially encased in a capsule of a vinyl polymer, which product is free flowing, easily formable into sheets, films, tubes and articles having a wide variety of shapes and capable of many different uses and applications.

Yet another object of this invention is to provide a product consisting of particles of vinyl polymers selectively shaped as tubes or shells.

Other objects will be apparent to those skilled in the art from reading the following description taken in conjunction with the accompanying drawing in which the single figure is a flow sheet of the process steps of the invention.

The objects of this invention are accomplished by polymerizing a liquid vinyl monomer in the presence of small, finely divided, water soaked, discrete particles dispersed in a dispersion medium.

In the water preconditioning process of this invention, the substrate is desirably steeped in an aqueous liquid at ambient temperature with constant agitation for a short period of time. In most cases a period of about fifteen minutes to one hour is sufficient. During this step the substrate is preconditioned for polymerization. Preferably, the aqueous liquid substrate slurry is then heated somewhat, such as to about 75° C.; however, the polymerization reaction which follows may be carried out satisfactorily at ambient temperatures. A liquid vinyl monomer and suitable catalyst are then added and the monomer polymerized. The polymerization is carried out with constant agitation while the reaction mixture is heated, if desired, to a temperature of about 35 to 100° C., which is desirable for most vinyl monomers. Polymerizations at this temperature are usually completed in about one-half to twelve hours. After the polymerization, the product is filtered, washed with water and a suitable solvent, such as methanol, and dried. The product consists of discrete particles, each substantially encased in a continuous shell of polymer. Where the substrate is a fiber, a tube of polymer is formed around the substrate. Upon extraction of the substrate, where the substrate is a fiber, the predominant product consists of discrete, free flowing tubes of polymer.

The unique products formed by the process of this invention comprise individual particles of substrate material substantially encased in tubes or shells of vinyl polymer. The polymer may constitute from less than 1% up to 90% of the combined weight of substrate and polymer. Desirably the polymer constitutes between about 5% to 90% by weight. Microscopic examination shows that each particle is essentially surrounded and encased by the polymer. Each encapsulated particle is distinct and separate from the other encapsulated particles. The product is free flowing. The discrete particle formation prevents bridging between shells during polymer formation and prevents significant agglomeration.

While the present invention is discussed in terms of encapsulating small "particles," it is to be understood that the term is intended to encompass particles, powders, short filaments and fibers of material. The substrate materials are preferably limited to fine powders and fibers. Particles greater than about 30 mesh (U.S. standard screen size) are usually not suitably encapsulated. Preferably, the particles pass through a 200 mesh screen, such particles are about 74 microns in their largest dimension. Similarly, fibers to be encapsulated are optimally no longer than about 1100 microns and preferably not longer than about 800 microns. Fibers substantially longer than 1100 microns tend to agglomerate preventing uniform polymer distribution on the fibers, and preventing the formation of a free-flowing polymer encapsulated product. However, longer fibers, up to a quarter of an inch, may be used by reducing the concentration of the fibers in the aqueous dispersion medium in order to avoid agglomeration. That is, when longer fibers are used, greater than minimum amounts of the dispersion medium are desirably used with the particles. In the practice of this invention, various particle sizes may be employed, and if it is desired to obtain specific properties, different sizes and shapes may be blended or otherwise employed.

The shapes which the polymer casing may take may be categorized as shells or tubes, depending on the shape of the substrate particle on which the polymer is formed. Shells are formed on powderlike substrates; tubes, which usually have closed ends, are formed on fiber-like substrates. In both shapes the polymer forms as an essentially continuous monolithic casing essentially surrounding the substrate. The closed tube product forms as a continuous shell essentially surrounding the fiber. If the substrate material is removed, the polymer shell retains its shape but is hollow, resembling a tube closed at the ends. Under microscopic examination the extracted products are seen to be elongated tubes of polymer. Both the shell and tube shapes may be fabricated or formed into articles under heat and pressure, both before and after removal of the substrate.

It has been found that the method of polymerizing vinyl polymers in the presence of substrates in a dispersion medium is suitable for those substrates which are readily dispersible in the medium and which are easily wettable by the vinyl monomer utilized. Among the substrates useful in the present invention are cellulose, wool, silica, asbestos, carbon black; pigments, extenders and fillers, such as titanium dioxide, calcium carbonate, barium sulfate; and the like.

The dispersed substrate-water-vinyl monomer system utilized in the process of this invention permits polymerization of a monomer in the absence of any emulsification or specific suspending agent. The accepted prior art techniques for polymerizing vinyl monomers in water make use of either emulsification agents or specific suspending agents which effectively control droplet and particle size in polymerization. The discrete substrate-vinyl monomer composition utilized in the process of this invention permits polymerization of a substrate-suspended vinyl monomer, instead of being limited to polymerization of droplets of monomer as in suspension or emulsion processes. It has been found that the use of either emulsifying or specific suspending agents is harmful to the reaction, resulting in agglomeration of the product and formation of excessive free polymer, that is, polymer not associated with the substrate. The use of the substrate aids in carrying out the process of this invention by enabling the reaction to continue to completion. For instance, a polymerization reaction carried out without a substrate and without emulsifying or suspending agents resulted in a sticky, low yield, incomplete polymerization reaction. The same experiment carried out in the presence of cellulose fibers went to completion with a good yield and no stickiness.

The process involves the use of an aqueous solution as a dispersion medium which being under substantially continuous agitation permits a multiplicity of individual discrete polymerization reactions to occur, each occurring at the site of a substrate particle. The aqueous solution serves the general functions of heat transfer medium, dispersion medium, and in some cases, as the catalyst solvent or catalyst modifier. The dispersion medium may be inert in the process or may aid in carrying out the polymerizing process. The amount of dispersion medium used in the polymerization reaction does not have any effect on the amount of free polymer content in the product. However, a sufficiently large amount of dispersion medium is necessary to provide a free-flowing slurry of the reactants.

The substrate is desirably steeped in the dispersion medium until the substrate is completely wetted by the dispersion medium prior to the addition of the monomer. Preferably the substrate is steeped for at least about fifteen minutes at ambient temperatures prior to the addition of the monomer. At higher or lower temperatures equivalent time periods are recommended. Where the steeping period is eliminated a different polymer form results. This is particularly evident where the substrate is a fiber because a tubular casing is not obtained.

The process of this invention is essentially a method for obtaining a locus control polymerization of vinyl monomers on the surfaces of particles in a dispersion medium. The products are made according to a general principle of locus polymerization which involves so ordering the geometry and chemistry of the reactants that polymers will form in or around the individual substrates with essentially little free polymer being formed apart from the substrate. Due to constant agitation, the process comprises a large number of individual isolated polymerization reactions, each at the site of a substrate particle and each reaction being independent of every other reaction. The locus of each reaction is limited to the substrate material; thus the substrate determines the site of the polymerization. The polymer formed conforms to the shape of the individual substrate particle.

A feature of this invention is that all of the polymer is polymerized or formed on the surface of the particle. Negligble amounts of free polymer, polymer not attached to a particle, are formed. A further feature of this invention is that the final product is made up of discrete particles, each substantially encased in a shell or capsule of the polymer, there being little agglomeration of the particles through polymer linkage between the shells on two different adjacent substrates.

The minimum amount of dispersion medium useful in the practice of this invention is that amount which will just cause the substrate to be free flowing under agitation. The agitation should desirably be thorough without being destructive to the substrate or the polymer formed thereon. If the agitation is insufficient the product tends to agglomerate. If the agitation is violent, the polymer tends to separate from the substrate, and long fibers tend to entangle.

The exact mechanism by which the substrates retain the monomer is not fully understood. However, it is possible that where the substrate material consists of small bundles of tubular materials, some of the monomer is retained therein due to capillary action. Where the substrate material is a single particle, it is possible that the monomer is retained thereon due to the affinity of the monomer for the substrate material. As polymerization takes place, the monomer polymerizes in situ forming a polymer capsule about the substrate material. Because the monomer is closely associated with each discrete particle, the polymer formed is similarly associated with the particle so that discrete, encapsulated substrates are formed.

The monomers which may be utilized in the practice of this invention are the monomers containing a vinyl group, and their derivatives. The operative monomers include methacrylates, acrylates, styrene, ring-substituted styrenes, vinyl esters, vinyl halides, conjugated diolefins and acrylonitrile. Monomers useful in the invention include 4-chloro-styrene, p-methyl styrene, vinyl acetate, vinyl chloride, vinylidene chloride, vinyl fluoride, allyl acetate, isopropenyl acetate, 4-vinyl pyridine, butadiene, isoprene, methyl acrylate, ethyl acrylate, propyl acrylate, n-butyl and iso-butyl acrylate, n-amyl and iso-amyl acrylate, n-hexyl acrylate, n-octyl acrylate, cyclohexyl acrylate, 2-ethyl hexyl acrylate, methyl methacrylate, ethyl methacrylate, propyl methacrylate, n-butyl and iso-butyl methacrylate, n-amyl and iso-amyl methacrylate, n-hexyl methacrylate, n-octyl methacrylate, cyclohexyl methacrylate, 2-ethyl hexyl methacrylate, and the like, used either singly or in combination to form copolymers.

Butadiene, vinyl chloride, trifluorochloroethylene, and the like, which are normally gases, may be utilized if liquefied prior to use.

When using normally gaseous monomers the substrate is steeped with constant agitation in water or an aqueous solution containing a catalyst. The gaseous monomer is liquefied and injected into a pressure vessel containing the substrate. The reaction mixture is desirably heated to about 25 to 150° C. and at this temperature, time periods of from about two to thirty-six hours are usually sufficient to complete the polymerization, after which the product is recovered. Any catalyst useful with liquid monomers may be used; however, the prefered catalysts are hydrogen peroxide, potassium persulfate, and the like, with or without a reducing agent, such as sodium bisulfite.

Where the polymer formed is soluble in the monomer, it has been found that in forming a high polymer content product, above about 60%, the monomer is preferably added in aliquots. However, where the polymer is insoluble in the monomer, a single monomer addition at the beginning of polymerization is satisfactory.

The substrate may be encapsulated with copolymers to obtain particular characteristics. Two or more different monomers may be simultaneously polymerized onto the substrate. The monomers may be selected to impart particular qualities to the finished product. Copolymerization may be used to make the fabrication or forming of articles from the product easier than with homopolymers. For instance, cellulose encapsulated with a copolymer of polystyrene and polyethyl acrylate is more easily formed than one made from polystyrene alone. As a further example, sheets prepared with cellulose-polystyrene may be stiff. The sheets prepared from cellulose-methyl acrylate are soft and flexible. Intermediate properties are shown by polymers of ethyl methacrylate and copolymers of styrene and ethyl acrylate.

The catalysts used for polymerization may be any of the catalysts which are well known for use in initiating polymerization. Among these are the conventional free radical catalysts, such as the peroxides, for instance benzoyl peroxide, azo compounds, for instance azoisobutyronitrile, persulfates, for instance, potassium persulfate, and redox type catalysts, for instance, potassium persulfate in combination with sodium bisulfite or ferrous sulfate. The catalyst is used in a range of 0.01 to 2% by weight of monomer. Preferably the catalyst amounts to about 0.5% by weight of the monomer. The catalyst must be soluble in the medium in which it is to be used. That is, the catalyst must be soluble in either the monomer or in the dispersion medium, which may be water or an aqueous solvent.

Care must be taken to exclude all air from the reaction vessel. Small amounts of oxygen which are left in the reactor may strongly inhibit polymerization and result in lower yields.

The polymerization temperature is preferably the reflux temperature of the reaction mixture. However, temperatures 15 to 20° C. below the reflux temperature may be used without affecting the reaction. The optimum temperature of the polymerization reaction depends on the specific catalyst and monomer being employed. However, where a polymer, such as polybutyl methacrylate, is formed which has a tendency to soften at elevated temperatures, care must be taken that the elevated temperatures are not reached during the polymerization reaction. Otherwise, agglomeration may take place between encapsulated substrates due to softening of the polymer.

The glass transition temperature ($T_g$) of the polymer may be used as a rough guide for the temperature of the reaction. In general, the process of this invention is operable to about 50° C. above the glass transition temperature without sticking or agglomeration of the particles. Without wishing to be bound by any particular theory of operation, it is believed that because of the thinness of the polymer layer on the substrate it is possible to use the higher temperatures to prepare polymer coated substrates having up to 90% by total weight of polymer without agglomeration.

The product consists of discrete, free-flowing particles made up of the substrate substantially encased in a vinyl polymer. The substrate may be removed from the polymer leaving shells or tubes of vinyl polymer. The product may be formed into a self-sustaining article, for instance by placing the product in a mold and forming it under heat and pressure. If desired, the substrate may be removed after the article has been formed; this is particularly advantageous where a porous article is desired. The vinyl polymer, after removal of the substrate, may also be formed into a self-sustaining article. Where the particles are lightly joined to each other by the forming process they are identifiable in the formed article as being made up of substrate substantially encased with the vinyl polymer. Similarly where the substrate is removed either before or after forming and the polymer is lightly formed, the polymer is identifiable as tubes or shells.

The encapsulated product of this invention may be dispersed in water, with wetting agents, etc., if desired, and formed into webs on conventional papermaking machines. Webs so prepared are desirably sintered to form self-sustaining sheets which may be further formed, if desired. The vinyl polymer encased molding materials may be used to form laminated structures in which the encased particles are fused, pressed or both pressed and fused, about rods, sheets or any desired core material to produce products for many and varied uses. Sheets may be formed on conventional papermaking machines. Sheets or other articles made according to the invention can be readily heat sealed or welded to each other or to other heat-sealing materials.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. Throughout the examples the sizes of substrate material used where not otherwise stated are: cellulose fibers, 400 to 700 microns; asbestos, 5 to 3700 microns; silica, 9 microns. All coatings are expressed in terms of percent by weight, the weight reference being the total of the substrate weight plus the polymer weight. The yields are expressed as a percent of theoretical conversion to polymer. Reactants and products are expressed in terms of parts by weight.

*Example 1*

Recipe: | Parts by weight
--- | ---
Cellulose fibers | 10
Styrene | 20
Water | 300
Azoisobutyronitrile | 0.1

The cellulose fibers were dispersed in the water and heated to 80° C. for 15 minutes in a three-neck reaction flask of 500 ml. capacity mounted with condenser, mechanical stirrer and nitrogen inlet, through which nitrogen was passed. At that temperature a first aliquot of 6.66 parts of styrene monomer solution of 0.1 part azoisobutyronitrile catalyst in 20 parts of styrene was added, and the temperature was raised to 95° C. The remaining monomer was added in two aliquots at intervals of 90 minutes. After a total polymerization time of four hours during which the reaction mixture was stirred, the product was filtered and washed, first with water and then with methanol to eliminate the unreacted monomer. After being dried the product had a polymer content of 61.5%. The conversion to polymer was 80%.

An important consideration in carrying out the reaction was the agitation speed which in the three-neck 500 ml. reaction flask was maintained at 400–450 r.p.m. using a half moon stirrer.

The product was cellulose fibers surrounded by tubes of polymer. The polymer conformed to the substrate fiber, and no free polymer was discernible. The cellulose fibers were extracted with sulfuric acid resulting in tubes of polymer conforming to the shape of the cellulose fiber on which they were formed.

*Example 2*

Recipe: | Parts by weight
--- | ---
Cellulose fibers | 100
Styrene | 187.7
Water | 3000
Azoisobutyronitrile | 0.9375

The procedure of Example 1 was repeated except that the substrate was increased tenfold while maintaining about the same ratio of monomer to substrate.

The cellulose was dispersed in water and the slurry heated to 80° C. within one hour. The catalyst was dissolved in the monomer and the solution added to the slurry in three aliquots. The first aliquot was added when the temperature reached 80° C., the other two after intervals of 90 minutes each. After four and one-half hours total polymerization time the product was filtered and washed with water and methanol. When dried, the product consisted of cellulose fibers surrounded by tubes of polymer and weighed 280 g., had a polymer content of 64.2%, and a polymer conversion of 95.8%.

Example 3

Recipe: Parts by weight
- Cellulose fibers _____ 100
- Butyl methacrylate _____ 330
- Water _____ 2500
- Potassium persulfate _____ 3
- Sodium bisulfite _____ 1

The cellulose was dispersed in 2300 parts of water and the slurry heated to 70° C. for 15 minutes. The catalyst was dissolved in 200 parts of water and added with the butyl methacrylate monomer in four aliquots at intervals of one hour. After five hours reaction, 392 parts of product were obtained with a polymer content of 74.5% and a conversion of 88.8%. The product consisted of cellulose fibers surrounded by tubes of polymer.

Example 4

Recipe: Parts by weight
- Cellulose _____ 10
- Methyl methacrylate _____ 18.8
- Water _____ 300
- Azoisobutyronitrile _____ 0.094

Following the procedure of Example 1, cellulose was coated with polymethyl methacrylate. The product had a polymer content of 62% and a conversion of 87.7%. The polymer was in the form of tubes surrounding the substrate.

A hand sheet was formed from the encapsulated product using the following procedure. Thirty-one parts of dry product were added to twelve hundred parts of water containing one part of a 2.5% solution (0.025 part) of Marasperse CB. The slurry was mixed in a Waring Blendor for three minutes and then poured into a beaker containing 30 parts of a 2.5% (0.75 part) of Aerosol O.T. The slurry was then gently poured into the head box of a hand sheet papermaking machine which was filled to one-half its volume above the screen. The water leg of the machine was released, and a wet web, about 11.5 inches square was formed on an 80 mesh screen. The web was released from the screen by passing a fine wire between the screen and the hand sheet, and the moisture content of the web was reduced by blotting. The moist web was placed on an aluminum plate, and both were heated at 350° F. until most of the excess moisture was driven off as evidenced by the appearance of dry spots and the ceasing of steam evolution. The dry sheet and the aluminum plate were then sintered by placing them in an oven for a few minutes at elevated temperatures. Upon inspection the polyvinyl particles were seen to have formed into a coherent paper-like sheet. The sheet was found to be laminated to the aluminum plate.

Example 5

Recipe: Parts by weight
- Cellulose _____ 10
- Acrylonitrile _____ 20
- Water _____ 300
- Azoisobutyronitrile _____ 0.1

Cellulose was also coated with polyacrylonitrile in a water system polymerization. The cellulose was dispersed in the water and heated to 80° C. for 15 minutes. All the monomer was charged at one time at the start of the polymerization because of the insolubility of the polymer in the monomer. Four hours of polymerization at 80° C. resulted in cellulose substantially encased in tubes of polymer. Polymer content was 50%; the conversion was 50%.

Example 6

Recipe: Parts by weight
- Cellulose _____ 100
- Styrene _____ 90
- Ethyl acrylate _____ 90
- Water _____ 3000
- Azoisobutyronitrile _____ 0.9

The cellulose was slurried in the water and heated to 70° C. for 15 minutes. A first aliquot of 50 parts of the mixture of ethyl acrylate and styrene, containing the catalyst in solution, was added and the reaction mixture heated to 81° C. The remaining mixture of the two monomers was then added in three aliquots at one hour intervals. After five hours reaction, the product was filtered, washed on the filter with water and methanol, and dried. The product consisted of 210 parts and had a polymer content of 52.3% with a conversion of 61.1%. The polymer was in the form of tubes surrounding the substrate.

A second experiment carried out using the same recipe and conditions resulted in 220 parts of product with a polymer content of 56.5% and a conversion of 66.6%.

Example 7

Recipe: Parts by weight
- Asbestos _____ 20
- Styrene _____ 43.8
- Water _____ 300
- Azoisobutyronitrile _____ 0.219

The mixture of water and asbestos was heated at 85° C. for 15 minutes before the addition of the styrene solution of the catalyst. The styrene solution was added in three aliquots at 90 minute intervals. The polymerization temperature was 93° C., and the polymerization time was five hours. The product was in the form of shells of polystyrene surrounding the asbestos particles and had a content of 65% polymer; there was a conversion of 85%.

Example 8

Recipe: Parts by weight
- Silvacel _____ 15
- Styrene _____ 50
- Water _____ 600
- Azoisobutyronitrile _____ 0.25

Silvacel is crude wood cellulose having fibers ranging from 5 to 7000 microns in length and a main fraction of 2742 microns.

The 15 parts of Silvacel were dispersed in 600 parts of water with rapid agitation and heated to 70° C. for 15 minutes. A solution of 0.25 part of azoisobutyronitrile in 50 parts of styrene monomer was added in three aliquots at ninety minute intervals. The temperature was raised to 95° C. and kept constant for four and one-half hours to polymerize the monomer. The product was then filtered, washed with methanol, and dried. The product consisted of 43 parts and had a tubular polymer content of 65.1%. The conversion to solid polymer was 56%.

Example 9

Recipe: Parts by weight
- Silica (Car-O-Sil) _____ 10
- Methyl methacrylate _____ 20
- Water _____ 250
- Azoisobutyronitrile _____ 0.1

The silica was slurried in the water and heated at the reaction temperature of 86° C. for 15 minutes. The methyl methacrylate solution of the catalyst was added to the heated slurry and maintained at the reaction temperature for four and one-half hours. The product consisted of silica substantially encased in shells of polymer and had a polymer content of 64.2% corresponding to a yield of 90% of polymer.

Example 10

Recipe: Parts by weight
- Cellulose _____ 15
- Water _____ 425
- Butyl methacrylate _____ 81.5
- Potassium persulfate _____ 0.75
- Sodium bisulfite _____ 0.375

The 15 parts of cellulose (Solka Floc) were dispersed in 375 parts of water and heated to 70° C. for 15 minutes. The catalyst, 0.75 part of potassium persulfate and 0.375 part of sodium bisulfite, was dissolved in 50 parts of water. A first aliquot of 17 parts of the catalyst solution and 5 parts of butyl methacrylate monomer were added. The remaining monomer was added in aliquots of 5 parts every ten minutes. Another 17 parts of catalyst solution were added after two hours reaction time, and the remainder two hours later. After a total reaction time of six hours the product was filtered, washed and dried. The product weighed 95 parts and consisted of a cellulose substantially encased with 84.2% of tubes of polybutyl methacrylate. The conversion was 98%.

*Example 11*

Recipe: Parts by weight
    Cellulose _____ 20
    Vinylchloride _____ 64
    Water _____ 500
    Potassium persulfate _____ 0.4
    Sodium bisulfite _____ 0.4

Cellulose was coated with polyvinylchloride in water by dispersing 20 parts of cellulose in 500 parts of water containing 0.4 part of potassium persulfate and 0.4 part of sodium bisulfite in the glass lining of a rocking autoclave for 30 minutes. The mixture was frozen in Dry Ice, and to it were added 64 parts of liquid vinylchloride. The autoclave was flushed with nitrogen to eliminate air and heated to 52° C. to polymerize the monomer.

After 24 hours reaction the product was filtered, washed with water and methanol, and dried. The dried product weighed 43.5 parts with a tubular polymer content of 54%. The product was molded into a disc at 140° C. and 3000 p.s.i.

*Example 12*

Recipe: Parts by weight
    Cellulose _____ 30
    Vinylchloride _____ 98
    Water _____ 600
    Potassium persulfate _____ 0.5
    Sodium bisulfite _____ 0.25

The cellulose and water in which the catalyst had been dissolved were charged into a one liter autoclave and mixed to a uniform slurry. Nitrogen was bubbled through the slurry for twenty minutes to de-aerate the water. The autoclave was closed and flushed with nitrogen.

The monomer was transferred as a gas from a storage cylinder and condensed to a liquid in a small pressure vessel with its valve kept in Dry Ice. The vessel was closed, weighed and pressurized to about 200 p.s.i.g. with nitrogen, and then connected to the autoclave to allow the liquid monomer to be injected into the autoclave. The polymerization was initiated by heating the reaction mixture to 60° C. and stirring. After 24 hours reaction, the product was filtered, washed with methanol and dried under vacuum at 48° C. The product contained 26.8% of tubular polymer.

*Example 13*

Recipe: Parts by weight
    Asbestos _____ 40
    Trifluorochloroethylene _____ 81
    Water _____ 800
    Potassium persulfate _____ 0.3
    Sodium bisulfite _____ 0.4

To 800 parts of deionized water, which was adjusted to a pH of 5 with dilute sulfuric acid, were added 0.3 part of potassium persulfate and 0.4 part of sodium bisulfite. The solution was placed in a one liter stainless steel, stirred autoclave together with 40 parts of asbestos. Nitrogen was bubbled through the mixture for twenty minutes. The autoclave was then sealed, and alternately evacuated, and flushed with nitrogen to remove air; finally, the autoclave was left under a vacuum. A total of 81 parts of trifluorochloroethylene was passed through a scrubbing train consisting of concentrated sulfuric acid, 10% sodium hydroxide, calcium sulfate, and silica gel, and was then condensed at Dry Ice temperatures into a small pressure vessel. The vessel was closed, pressurized to 200 p.s.i.g. with nitrogen, and the contents injected into the autoclave. The autoclave was heated to 54–56° C., with stirring, for twenty hours at pressures of 180–185 p.s.i.g. The contents were then removed, filtered, washed with water and methanol, and then dried at 105–110° C. The product, in the form of relatively free flowing asbestos fibers, weighed 54.7 parts of which 14.7 parts or 26% was polytrifluorochloroethylene. The product was completely hydrophobic, could be molded at temperatures of 260° C., and under a microscope appeared well enscapsulated with a polymer.

*Example 14*

Recipe: Parts by weight
    Asbestos _____ 40
    Trifluorochloroethylene _____ 60
    Water _____ 800
    Potassium persulfate _____ 1.0
    Ferrous sulfate _____ 0.5
    Potassium pyrophosphate _____ 0.5

To 800 parts of ionized water at pH 5, there were added 40 parts asbestos, 1.0 part potassium persulfate, 0.5 part ferrous sulfate ($FeSO_4 \cdot 7H_2O$), 0.5 part potassium pyrophosphate and 60 parts trifluorochloroethylene. The mixture was heated in an autoclave at 54° C. for 21 hours at a maximum pressure of 200 p.s.i.g. The pressure drop from maximum during the experiment was 41 p.s.i. The product was recovered, filtered, washed in water and methanol and then dried. The product weighed 50.5 parts representing a tubular polymer casing of 25.3%. The conversion was 26%.

*Example 15*

Recipe: Parts by weight
    Asbestos _____ 20
    Water _____ 300
    Potassium persulfate _____ 0.3
    Sodium bisulfite _____ 0.15
    Vinylchloride _____ 59

The 20 parts of asbestos were dispersed in 300 parts of deionized water containing in solution 0.3 part of potassium persulfate and 0.15 part sodium bisulfite. The resulting slurry was placed in the glass lining of a rocking autoclave for 30 minutes. The slurry was frozen in Dry Ice, and 59 parts of liquid vinylchloride were added. After 24 hours reaction at 50° C. the product was filtered, washed and dried. The product weighed 63 parts and consisted of asbestos substantially encapsulated with 68% of tubes of polymer. The polymer yield was 72.8%.

*Example 16*

Recipe: Parts by weight
    Asbestos _____ 20
    Water _____ 300
    Potassium persulfate _____ 0.3
    Sodium bisulfite _____ 0.15
    Vinylchloride _____ 76

The procedure of Example 15 was repeated except that the monomer concentration was increased. The product after washing and drying weighed 80 parts and had a tubular polymer content of 75%. The yield of polymer was about 80%.

*Example 17*

Recipe: Parts by weight
    Asbestos _____ 35
    Water _____ 450
    Potassium persulfate _____ 0.3
    Sodium bisulfite _____ 0.15
    Vinyl acetate _____ 17.5
    Vinylchloride _____ 52.5

The procedure of Example 16 was repeated except that vinyl acetate was added and a copolymer with vinylchloride prepared. The product after washing and drying consisted of the asbestos substantially encapsulated with about 24% vinylchloride-vinyl acetate copolymer in the form of tubes.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. For instance, in the examples cellulose, titanium dioxide, calcium carbonate and barium sulfate particles and wool fibers and particles may be substituted for the substrates used with good results.

What is claimed is:

1. A process for the polymerization of vinyl monomer on a discrete substrate in the form of particles, fibers or filaments to form a discrete, free-flowing product comprising the steps of:
   (a) steeping said substrate in an aqueous medium to saturate said substrate with said medium,
   (b) forming a free-flowing slurry of said substrate and said aqueous medium,
   (c) adding a liquid vinyl monomer to said slurry,
   (d) maintaining vinyl monomer polymerization catalyst in said slurry,
   (e) polymerizing said monomer; forming vinyl polymer on each individual particle, fiber or filament of said substrate,
   (f) said substrate being selected from the class consisting of cellulose, wool, silica and asbestos,
   (g) said vinyl monomer being selected from the class consisting of methacrylates, acrylates, styrene, ring-substituted styrenes, vinyl esters, vinyl halides, conjugated diolefins and acrylonitrile,
   (h) said catalyst being soluble in at least one of said monomer and said medium and being selected from the class consisting of peroxides, persulfates, azo compounds and redox catalysts, and
   (i) said medium being selected from the class consisting of water and aqueous solutions.

2. A process as in claim 1 wherein the polymer formed is soluble in said monomer, further comprising adding said monomer in a plurality of aliquot portions in order to form a polymer content between about 60 and 90% based on the weight of said polymer and said substrate.

3. A process as defined in claim 1 wherein said monomer is polymerized to form up to about 90% of polymer based on the total weight of said substrate and said polymer.

4. A process as defined in claim 1 wherein said substrate is steeped in said aqueous medium for at least about 15 minutes.

5. A process as defined in claim 1 wherein said polymerization catalyst is dissolved in said aqueous medium prior to the addition of said liquid vinyl monomer.

6. A process as defined in claim 1 wherein said liqiud vinyl monomer added to said slurry has dissolved therein said polymerization catalyst.

7. A process as defined in claim 1 wherein said substrate comprises particles smaller than about 30 mesh in size.

8. A process as defined in claim 1 wherein said substrate comprises fibers smaller than about 1100 microns in length.

References Cited by the Examiner

UNITED STATES PATENTS

| | | | |
|---|---|---|---|
| 2,399,259 | 4/1946 | Taylor | 161—139 XR |
| 3,092,438 | 6/1963 | Kruger | 264—126 |
| 3,102,050 | 8/1963 | Cauterino et al. | |

ALEXANDER H. BRODMERKEL, *Primary Examiner.*

ROBERT F. WHITE, *Examiner.*

P. E. ANDERSON, F. WHISENHUNT,
*Assistant Examiners.*